US012679236B2

(12) United States Patent
Gjinali et al.

(10) Patent No.: US 12,679,236 B2
(45) Date of Patent: Jul. 14, 2026

(54) CHARGING SYSTEM FOR ELECTRIC TRANSPORT SYSTEMS

(71) Applicant: Clean City SA, Lugano (CH)

(72) Inventors: Agim Gjinali, Lugano (CH); Rron Gjinali, Lugano (CH)

(73) Assignee: Clean City SA, Lugano (CH)

( * ) Notice: Subject to any disclaimer, the term of this patent is extended or adjusted under 35 U.S.C. 154(b) by 846 days.

(21) Appl. No.: 17/970,063

(22) Filed: Oct. 20, 2022

(65) Prior Publication Data

US 2023/0117921 A1 Apr. 20, 2023

Related U.S. Application Data

(60) Provisional application No. 63/257,765, filed on Oct. 20, 2021.

(51) Int. Cl.
| | |
|---|---|
| *B60L 53/54* | (2019.01) |
| *B60L 53/31* | (2019.01) |
| *B60L 53/51* | (2019.01) |
| *B60L 53/53* | (2019.01) |
| *H01M 8/24* | (2016.01) |

(52) U.S. Cl.
CPC .............. *B60L 53/54* (2019.02); *B60L 53/31* (2019.02); *B60L 53/51* (2019.02); *B60L 53/53* (2019.02); *H01M 8/24* (2013.01)

(58) Field of Classification Search
CPC .................................................... B60L 53/54
USPC ........................................................ 320/109
See application file for complete search history.

(56) References Cited

U.S. PATENT DOCUMENTS

| | | | |
|---|---|---|---|
| 8,278,881 B2 | 10/2012 | Woody et al. | |
| 2012/0326668 A1 | 12/2012 | Ballatine et al. | |
| 2014/0138452 A1 | 5/2014 | Fomanski et al. | |
| 2016/0121735 A1* | 5/2016 | Sugano ................... | H02J 7/342 |
| | | | 320/109 |
| 2019/0322180 A1* | 10/2019 | Song ....................... | B60L 58/31 |
| 2020/0376975 A1* | 12/2020 | Martin ............. | H01M 8/04559 |
| 2022/0014038 A1* | 1/2022 | Martin .................. | H02J 7/0042 |

(Continued)

FOREIGN PATENT DOCUMENTS

| | | | |
|---|---|---|---|
| DE | 102017007213 A1 | 1/2019 | |
| DE | 102019005071 A1 | 10/2020 | |

(Continued)

OTHER PUBLICATIONS

An International Search Report and Written Opinion of the International Searching Authority on Feb. 13, 2023 in connection with PCT/EP2022/079233.

(Continued)

*Primary Examiner* — Jerry D Robbins
(74) *Attorney, Agent, or Firm* — Baker & McKenzie LLP

(57) ABSTRACT

A charging system that includes a fuel cell system for generating power for an electric transport system is described. The charging system includes at least one hydrogen fuel cell for power generation, and a charging component includes at least one charger. The charger includes an electrical coupling configured to couple the fuel cell system to at least one electric transport system so that electrical power can be transferred from the fuel cell system to the electric transport system. The fuel cell system provides the electrical power to the electric transport system without requiring access to an electric grid.

20 Claims, 12 Drawing Sheets

(56)        References Cited

U.S. PATENT DOCUMENTS

| | | | | |
|---|---|---|---|---|
| 2022/0052533 A1* | 2/2022 | Telefus | .................. | B60L 55/00 |
| 2023/0040981 A1* | 2/2023 | Kwon | .................... | B60L 53/54 |
| 2024/0339640 A1* | 10/2024 | Leighton | ................ | B60L 58/30 |

FOREIGN PATENT DOCUMENTS

| | | | |
|---|---|---|---|
| PT | 2020001667 | Y | 1/2020 |
| WO | 2020001667 | A1 | 1/2020 |

OTHER PUBLICATIONS

Office Action in Eurasian Application No. 202490808 dated Sep. 23, 2024, 1 page.

Search Report issued by the United Arab Emirates Ministry of Economy, in UAE Application No. P2024-00975 dated Sep. 24, 2025, 2 pages.

\* cited by examiner

*Mobile Version: Van, Truck or Container*

CHARGING SYSTEM FOR ELECTRIC TRANSPORT SYSTEMS

CROSS REFERENCE TO RELATED APPLICATIONS

This application claims priority to U.S. Provisional Application No. 63/257,765 filed Oct. 20, 2021, the contents of which is included herein in its entirety.

BACKGROUND

There is a growing number of electric cars in the market, leading to increased demand for chargers. Typically chargers are connected to a region's electric grid, and the increased demands for powering homes and businesses have put a strain on the electric grids. With electric cars becoming more commonly used, the demand for chargers has further increased the load on already strained electric grids. For this reason, it is difficult for one to find chargers to charge one's car at select locations, limiting the proliferation of electric vehicles in many regions.

BRIEF SUMMARY

According to one aspect of the subject matter described in this disclosure, a charging system is provided. The charging system includes a fuel cell system for generating power for at least one electric transport system. The fuel cell system receives hydrogen as a fuel for power generation. At least one charger is coupled to the fuel cell system and the at least one electric transport system. The at least one charger provides the power generated by the fuel cell system directly to the at least one electric transport system without requiring access to an electric grid.

Additional features and advantages of the present invention are described in, and will be apparent from, the detailed description of this disclosure.

In some embodiments, the present disclosure relates to a charging system that may contain a fuel cell system for generating power for an electric transport system, the fuel system containing at least one hydrogen fuel cell for power generation. The charging system may contain a charging component comprising at least one charger containing an electrical coupling configured to couple the fuel cell system to the at least one electric transport system so that electrical power can be transferred from the fuel cell system to the electric transport system. The fuel cell system may provide the electrical power to the electric transport system without requiring access to an electric grid.

According to some embodiments, the present disclosure relates to a vehicular charging system containing a fuel cell system for generating power for an electric transport system, the fuel system containing at least one hydrogen fuel cell for power generation. The vehicular charging system may contain a charging component comprising at least one charger containing an electrical coupling configured to couple the fuel cell system to the at least one electric transport system so that electrical power can be transferred from the fuel cell system to the electric transport system. The fuel cell system may provide the electrical power to the electric transport system without requiring access to an electric grid. The vehicular charging system may include a container configured to house each of the fuel cell system and the charger, wherein the container is mobile. The container may include an automobile containing an engine, a plurality of wheels, and a drive system, the automobile configured to transport the vehicular charging system from one position to another on land. The container may include a watercraft having a hull and a propulsion system, the watercraft configured to transport the vehicular charging system from one position to another on water.

A charging system and a vehicular charging system may each include at least one hydrogen fuel cell that forms at least one fuel cell stack assembly containing from about 1 to about 50 hydrogen fuel cells. Each of the charging system and vehicular charging system may contain from about 1 to about 10 fuel cell stack assemblies that each may include from about 1 to about 50 hydrogen fuel cells. Each fuel stack assembly may be configured to provide an electrical power to the electric transport system ranging from about 30 kW to about 3,000 kW. In some embodiments, each fuel stack assembly may be configured to provide a voltage to the electric transport system ranging from about 30 volts as direct current to about 3,000 volts as direct current.

A charging system and a vehicular charging system may each include at least one storage tank for storing hydrogen as fuel for the at least one hydrogen fuel cell. Hydrogen may be produced from at least one of a natural gas processing plant 150 and a water electrolysis plant 145. The charging system and the vehicular charging system may include photovoltaics configured to convert light into electricity; DC batteries connected to the photovoltaics through an electrical connector configured to transport the electricity produced by the photovoltaics to the DC batteries for storage. DC batteries may be connected to the electric transport system through another electrical connector configured to provide the electrical power to the electric transport system.

In some embodiments, a charging system and a vehicular charging system may each include an even number of fuel cell stack assemblies arranged in pairs and in a parallel configuration, each fuel cell stack comprising from 1 to about 50 hydrogen fuel cells. Each pair of fuel cell stacks may provide about 600 volts as direct current to the electric transport system. The electric transport system may include at least one of an automobile and a watercraft.

BRIEF DESCRIPTION OF THE DRAWINGS

The disclosure is illustrated by way of example, and not by way of limitation, in the figures of the accompanying drawings in which like reference numerals are used to refer to similar elements. It is emphasized that various features may not be drawn to scale and the dimensions of various features may be arbitrarily increased or reduced for clarity of discussion.

DETAILED DESCRIPTION

Figure 1:
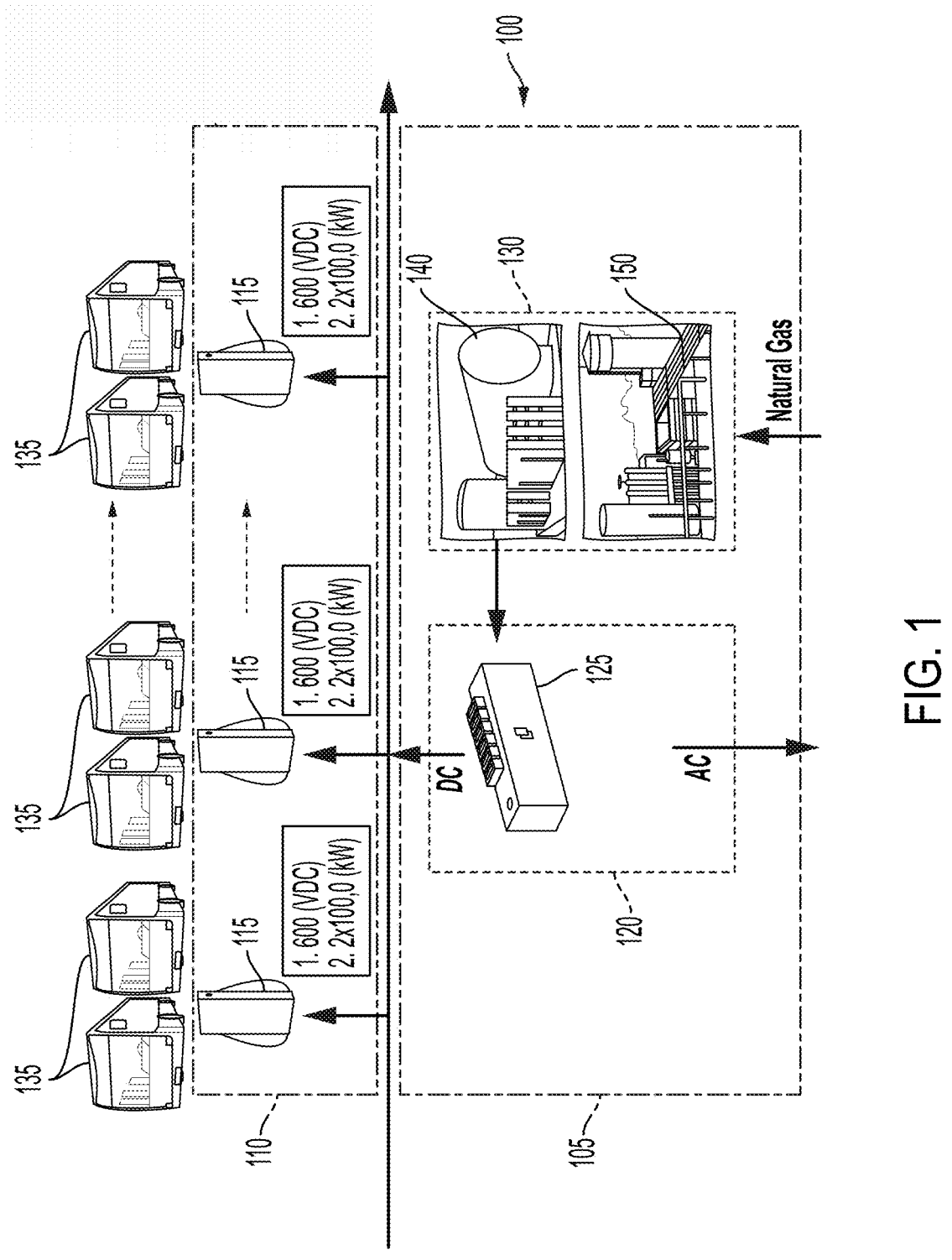
FIG. 1 is a schematic diagram of a first embodiment of a charging system for charging electric vehicles, in accordance with some embodiments.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context.

This disclosure describes a charging system for charging various electric transport systems, such as electric vehicles, electric boats, or the like, without relying on an electric grid.

The charging system may utilize a number of hydrogen fuel cells arranged specifically to charge the electric transport systems. In some embodiments, the charging system may be a vehicle or floating platform for delivering electric power to electrical transport systems. The charging system described herein eliminates the need for chargers to be directly connected to the electric grid. Moreover, the power generation process used produces zero air emissions.

FIG. 1 is a schematic diagram of a first embodiment of a charging system 100 for charging electric transport systems 135, in accordance with some embodiments. The charging system 100 may include a power generation component 105 including a fuel cell system 125 and a charging component 110 including a charger 115. The power generation component 105 may include a plurality of hydrogen fuel cells to form a fuel cell stack assembly 120. The fuel cell stack assembly 120 may receive hydrogen ($H_2$) from a fuel processing system 130 for fuel and may be stored in the hydrogen storage tanks 140. The fuel processing system 130 may include a natural gas processing plant 150 that receives natural gas and produces hydrogen. This hydrogen may be later stored in storage tanks as fuel for the hydrogen fuel cells.

The charging component 110 may include several chargers 115, each having a fuel stack assembly 120 described earlier with unlimited and unrestricted power range for example 30 kW-3000 kW and unlimited and unrestricted voltage range from about 30 V as a direct current to about 3000 V as a direct current. The fuel stack assembly 120 may provide an electrical power to an electric transport system 135 through a charger 115 at an electrical power ranging from about 30 kW to about 3,000 kW. The fuel stack assembly 120 may provide an electrical power to the electric transport system 135 at a power of about 30 kW, or about 100 kW, or about 500 kW, or about 1,000 kW, or about 1,500 kW, or about 2,000 kW, or about 2,500 kW, or about 3,000 kW, where about includes plus or minus 250 kW. The fuel stack assembly 120 may provide a voltage to the electric transport system 135 at a range from about 30 volts to about 3,000 volts, as direct current. The fuel stack assembly 120 may provide a voltage to the electric transport system 135 at about 30 volts, or about 100 volts, or about 500 volts, or about 1,000 volts, or about 1,500 volts, or about 2,000 volts, or about 2,500 volts, or about 3,000 volts, where about includes plus or minus 250 volts.

In some embodiments, a fuel stack assembly 120 may include two 100 kW hydrogen fuel cells producing 600 V in DC for each charging station to charge electric vehicles. Note the charging system 100 of FIG. 1 does not require accessing the electrical grid for power.

In some implementations, the fuel stack assembly 120 may include more than 2 hydrogen fuel cells producing more DC voltage for charging.

Figure 2:
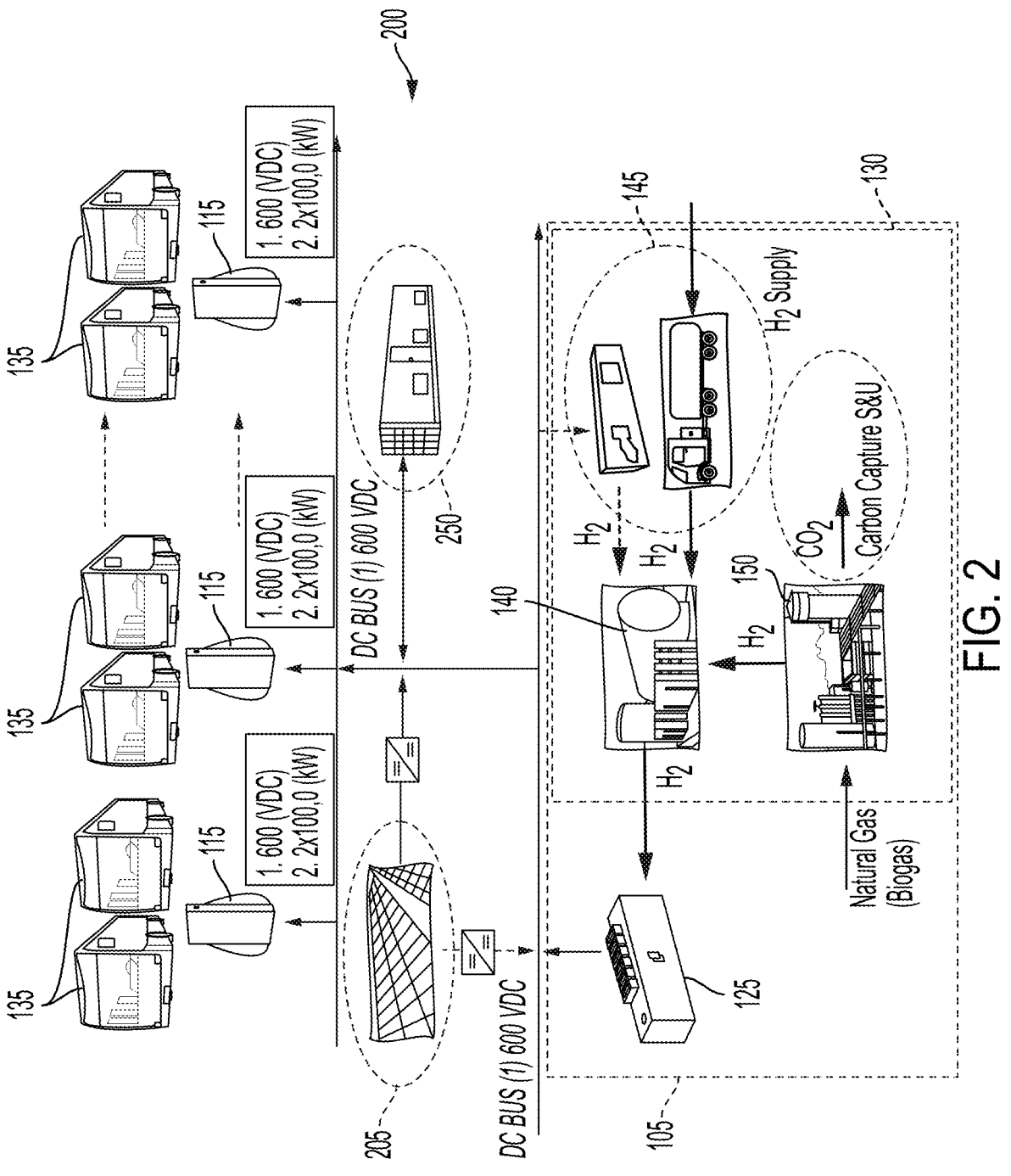
FIG. 2 is a schematic diagram of a second embodiment of a charging system for charging electric vehicles, in accordance with some embodiments.

FIG. 2 is a schematic diagram of a second embodiment of a charging system 200 for charging electric transport systems 135, in accordance with some embodiments. The charging system 200 of FIG. 2 is similar to the charging system 100 of FIG. 1. The key difference is each charging station of FIG. 2 may utilize one fuel cell, which may require augmenting additional power sources to provide sufficient DC voltage for charging. In this case, additional hydrogen may be retrieved from electrolysis and outside hydrogen suppliers to be stored in the hydrogen storage tanks 140 beside the hydrogen provided from the natural gas processing plant 150. A charging station may also include photovoltaics 205.

Additional power may be provided by photovoltaics (PV) 205, such as solar cells or the like, and DC batteries stored in storage component 250 that may include a battery storage. The power provided by the photovoltaics and DC batteries are sent via a DC bus (1). The DC bus (1) may be connected to a DC bus (2). The power provided by the fuel cell of FIG. 2 is sent to DC bus (2). In some instances, the power provided by the photovoltaics may be sent to the DC bus line (1).

The DC bus lines (1) and (2) are configured to provide 600 V DC to the chargers 115, however, in other embodiments this may vary. Note the charging system 200 of FIG. 2 does not require accessing the electrical grid for power.

Figure 3:
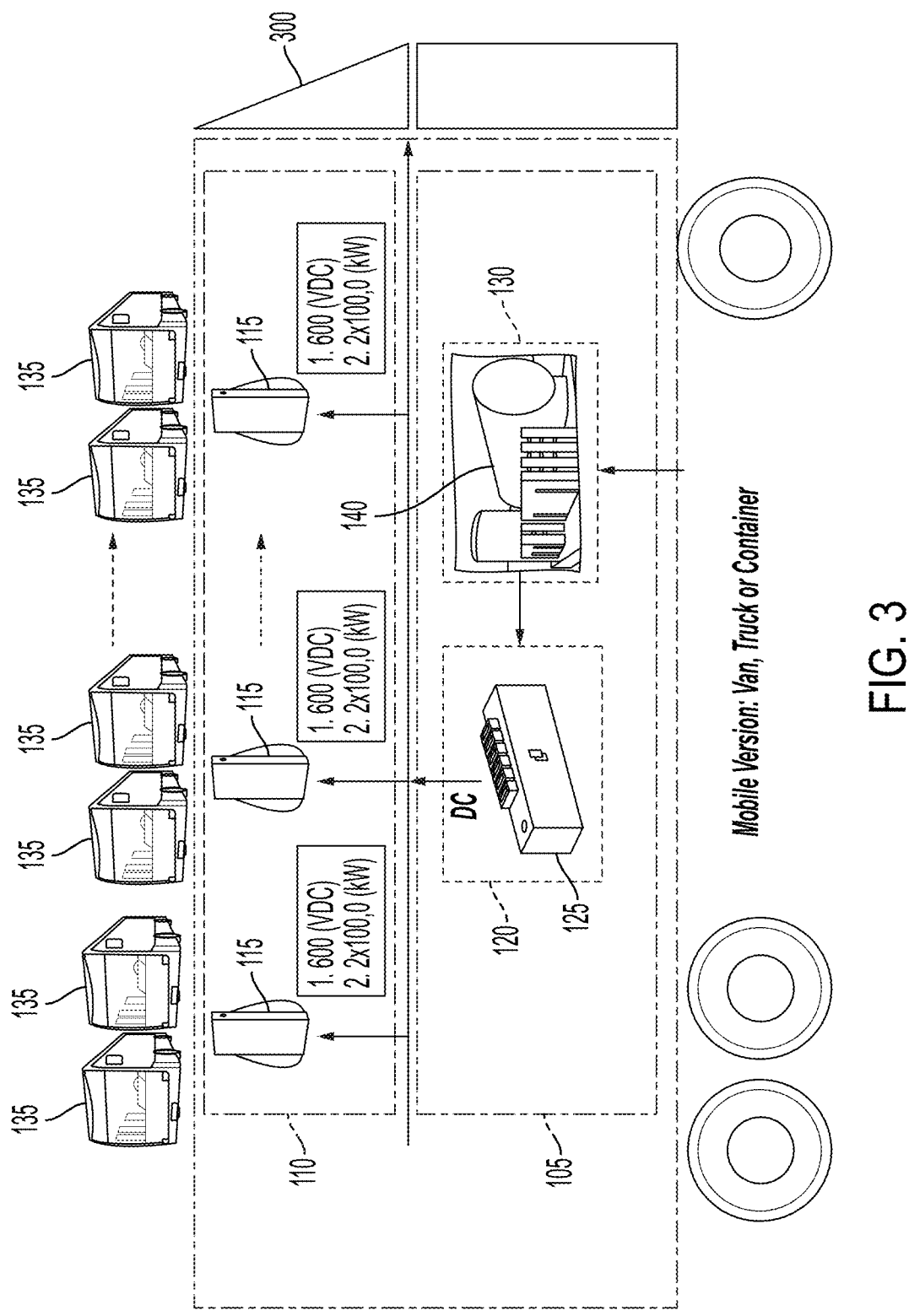
FIG. 3 is a schematic diagram of a vehicular mobile charging system for charging electric vehicles, in accordance with some embodiments.

FIG. 3 is a schematic diagram of a vehicular mobile charging system 300 for charging electric transport systems 135, in accordance with some embodiments. The vehicular mobile charging system 300 may be a vehicle that may directly charge other electric transport systems 135. Also, the mobile charging system 300 may house a power generation component 105 including a fuel cell system 125 and a charging component 110 containing a charger 115. The power generation component 105 of the mobile charging system 300 may include a plurality of hydrogen fuel cells to form a fuel cell stack assembly 120. The fuel cell stack assembly 120 may receive hydrogen (H$_2$) from a fuel processing system 130 for fuel. The fuel processing system 130 may include hydrogen storage tanks 140 for receiving and storing hydrogen as fuel for the hydrogen fuel cells.

A charging component 110 may include several chargers 115 within the mobile charging system 300, each having a fuel stack assembly 120 as described earlier. In this case, the fuel stack assembly 120 may include two 100 kW hydrogen fuel cells producing 600 V in DC for each charger 115 to charge electric transport systems 135, but in other embodiments there may be more or less fuel cells used in the fuel stack assembly 120. The charging component 110 may include several chargers 115, for example from about 1 charger to about 50 chargers, or more. The charging component 110 may include about 1 charger, or about 10 chargers, or about 20 chargers, or about 30 chargers, or about 40 chargers, or about 50 chargers, where about includes plus or minus 5 chargers. The number of fuel cells used in the fuel cell stack assembly 120 may depend on the type of transport system being charged. Note the charging system 300 of FIG. 3 does not require accessing the electric grid for power.

Figure 4:
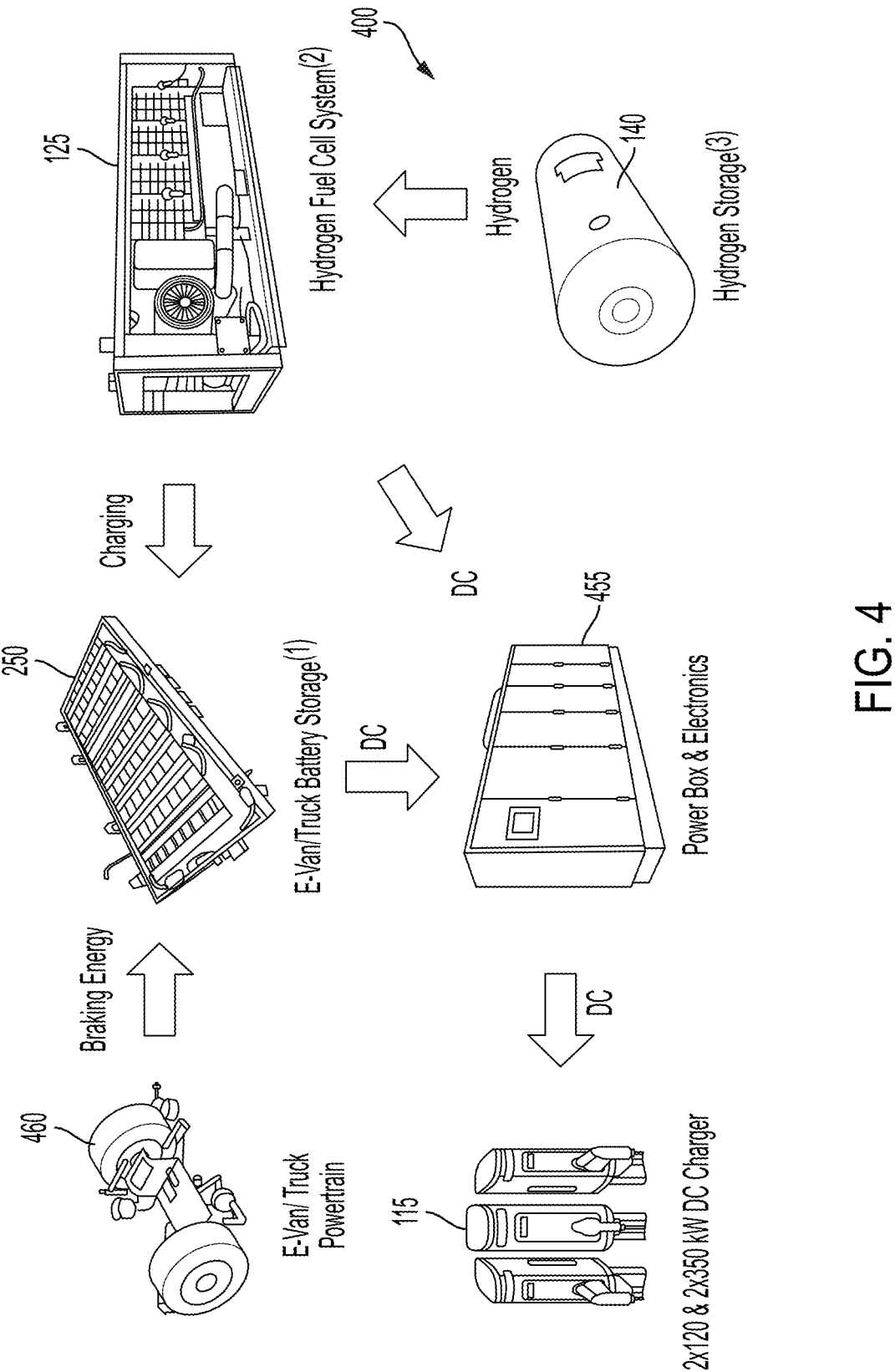
FIG. 4 is a schematic diagram of components in the vehicular mobile charging system of FIG. 3 used for charging, in accordance with some embodiments.

FIG. 4 is a schematic diagram of components in the vehicular mobile charging system 300 of FIG. 3 used for charging electric transport systems 135, in accordance with some embodiments. The components for charging electric transport systems 135 may include the braking system of the mobile charging system 400, truck powertrain system 460 of the mobile charging system 400, battery storage of the mobile charging system 400, a hydrogen fuel cell system 125, hydrogen storage tanks 140, a power box 455, and multiple chargers 115. In this case, the mobile charging system 400 may be an electric vehicle using battery storage for power. With this arrangement, the fuel cell system 125 receives hydrogen fuel from the hydrogen storage tanks 140 to charge the battery storage and provide power for charging purposes via the power box. Moreover, the mobile charging system 400 may also use the braking system to charge the battery storage. The battery storage provides excess power to the power box, and the power box regulates the power received by both the battery storage and fuel cell system 125 to the chargers 115 for charging. Note the components of FIG. 4 do not require accessing the electric grid for power.

In some embodiments, the hydrogen fuel cell system 125 may include a fuel cell stack 120 arrangement having several fuel cells as described herein. The hydrogen fuel cell system 125 may include from about 1 fuel cell stack assembly to about 10 fuel cell stack assemblies, or more. For example, The hydrogen fuel cell system 125 may include about 1 fuel stack assembly, or about 2 fuel stack assemblies, or about 3 fuel stack assemblies, or about 4 fuel stack assemblies, or about 5 fuel stack assemblies, or about 6 fuel stack assemblies, or about 7 fuel stack assemblies, or about 8 fuel stack assemblies, or about 9 fuel stack assemblies, or about 10 fuel stack assemblies, where about includes plus or minus 1 fuel stack assembly. Each fuel cell stack 120 assembly may include from about 1 hydrogen fuel cell to about 50 hydrogen fuel cells. In some embodiments, each fuel cell stack 120 assembly may include about 1 hydrogen fuel cell, or about 10 hydrogen fuel cells, or about 20 hydrogen fuel cells, or about 30 hydrogen fuel cells, or about 40 hydrogen fuel cells, or about 50 hydrogen fuel cells, where about includes plus or minus 5 hydrogen fuel cells.

Figure 5:
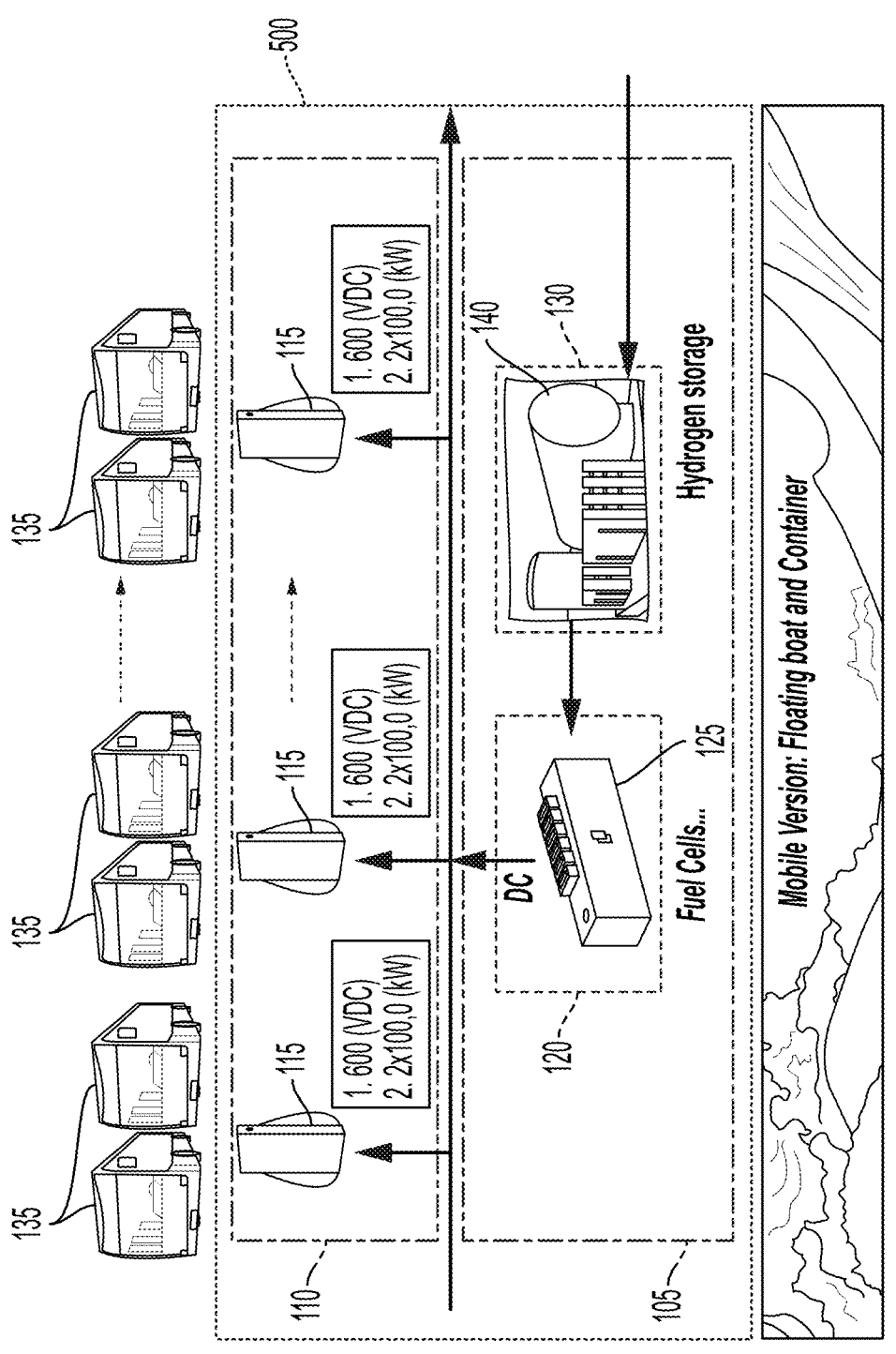
FIG. 5 is a schematic diagram of a floating mobile charging system for charging electric floating transport systems, in accordance with some embodiments.

FIG. 5 is a schematic diagram of a floating mobile charging system 500 for charging electric transport systems 135, in accordance with some embodiments. The floating mobile charging system 500 may be a floating transport system, such as a boat or shipping container that may directly charge other electric floating transport systems or vehicles. Also, the floating mobile charging system 500 may house a power generation component 105 and a charging component 110. The power generation component 105 of the floating charging system 500 may include a plurality of hydrogen fuel cells to form a fuel cell stack assembly 120. The fuel cell stack assembly 120 may receive hydrogen (H$_2$) from a fuel processing system 130 for fuel. The fuel processing system 130 may include hydrogen storage tanks 140 for receiving and storing hydrogen as fuel for the hydrogen fuel cells.

The charging component 110 may include several chargers 115 within the floating charging system 500, each having a fuel stack assembly 120 described earlier. In this case, the fuel stack assembly 120 may include two 100 kW hydrogen fuel cells producing 600 V in DC for each charger 115 to charge electric transport systems 135, but in other embodiments there may be more or less fuel cells used in the fuel stack assembly 120. The number of fuel cells used in the fuel cell stack assembly 120 may depend on the type of transport system being charged. Note the charging system 500 of FIG. 5 does not require accessing the electric grid for power.

Figure 6:
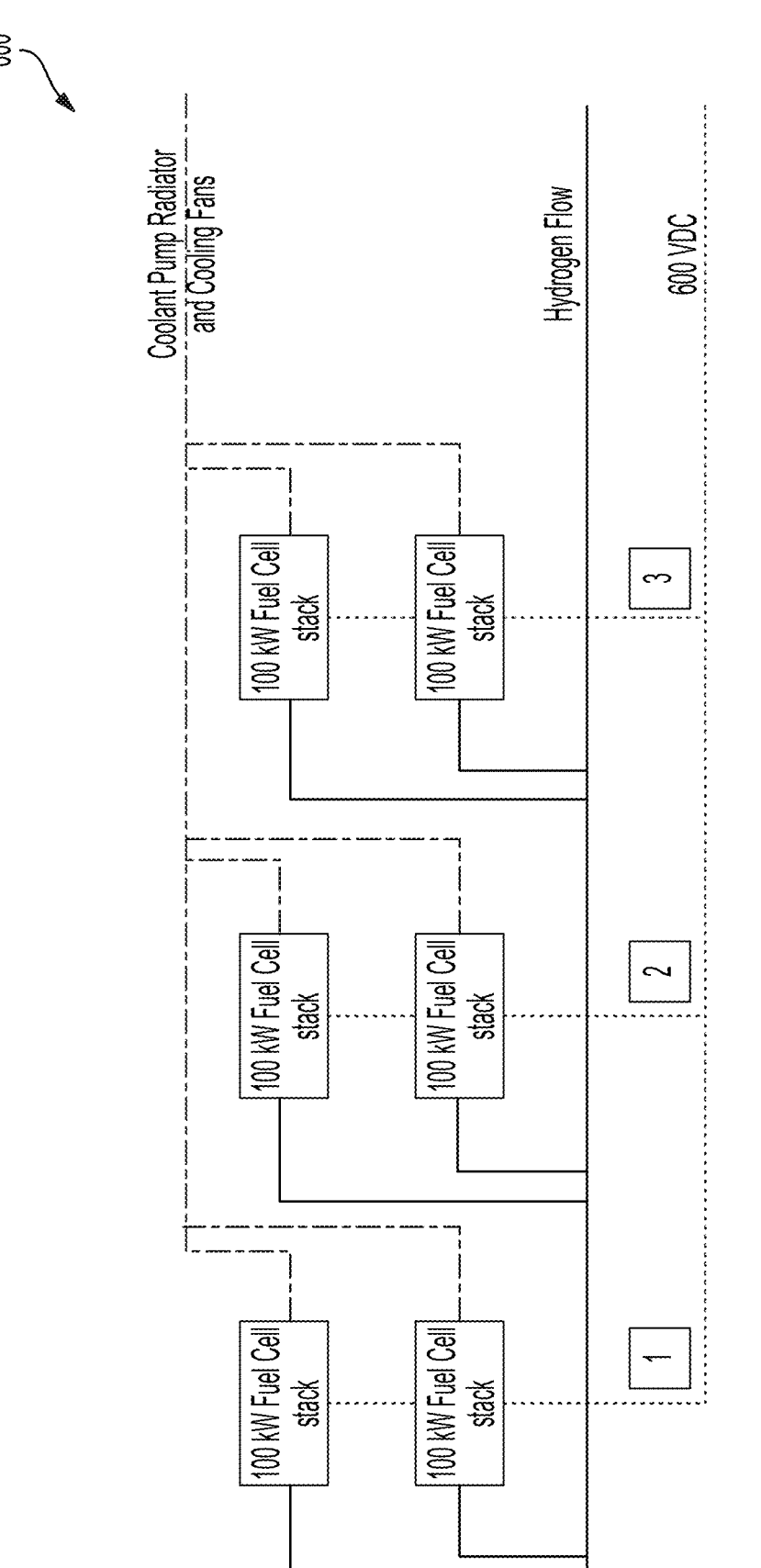
FIG. 6 is a detailed system diagram of a power generation component, in accordance with some embodiments.

FIG. 6 is a detailed system diagram of a power generation component 105, in accordance with some embodiments. The power generation component 105 shown in FIG. 6 may be applied to the power generation components 105 discussed in FIGS. 1-3 and 5. Note each fuel cell stack may receive hydrogen fuel via a hydrogen flow line. Moreover, each fuel cell stack receives ventilation and/or coolant material via a coolant flow line for temperature regulation.

The power generation component 105 may include six 100 kW fuel cell stacks where three pairs of the fuel cell stacks are arranged in a parallel configuration, as shown in FIG. 6. In other embodiments, other types of fuel cell stacks may be used. Each pair of the fuel cell stacks may be connected to one of several chargers 115. Also, each pair of fuel cell stacks may provide 600 V DC at a charger 115 for charging. Note the charging system 600 of FIG. 6 does not require accessing the electrical grid for power.

Figure 7:
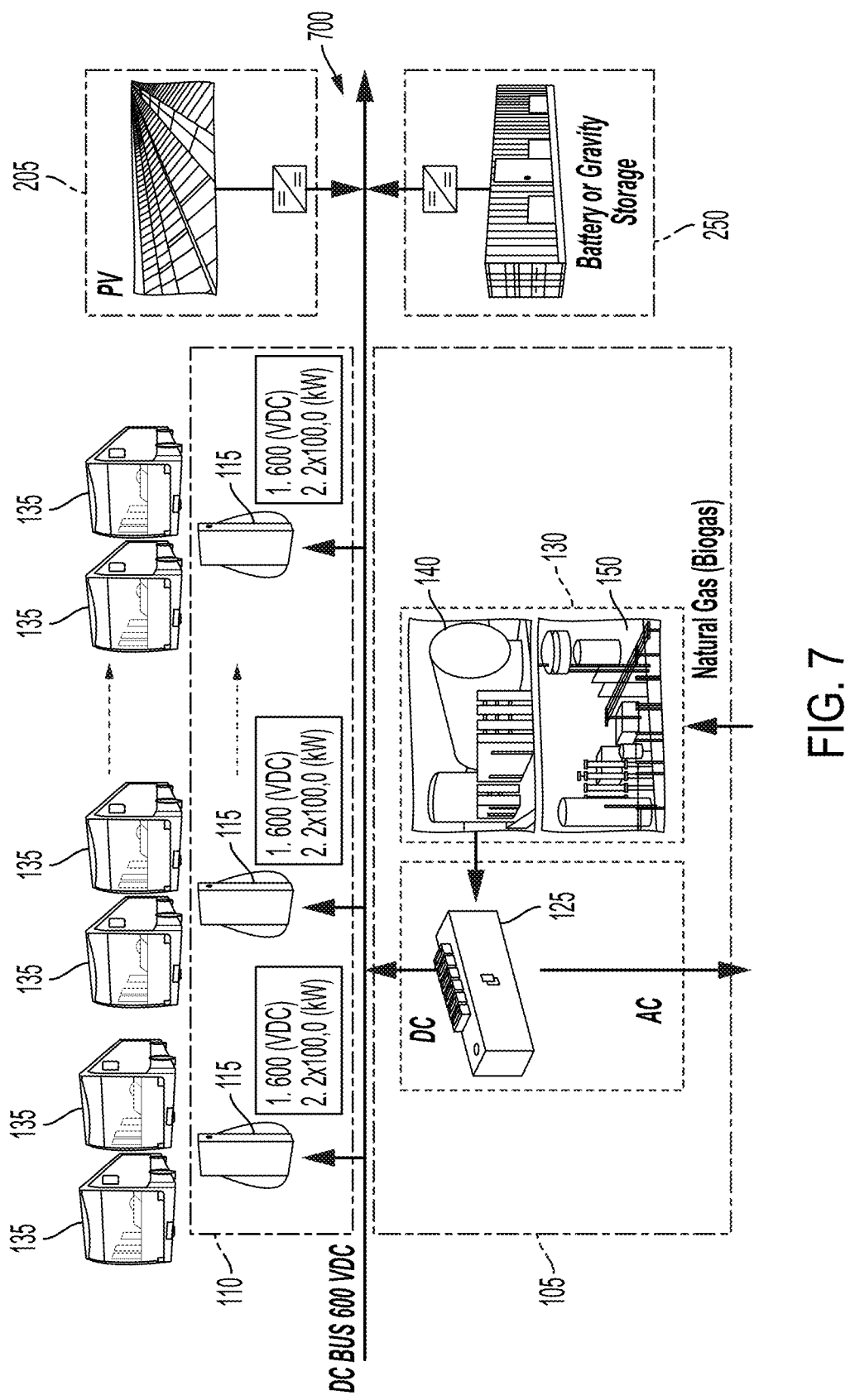
FIG. 7 is a schematic diagram of another embodiment of a charging system for charging electric vehicles, in accordance with some embodiments.

FIG. 7 is a schematic diagram of another embodiment of a charging system 700 for charging electric transport systems 135, in accordance with some embodiments. The charging system 700 of FIG. 7 is similar to the charging system 100 of FIG. 1. The difference between the charging systems are the power generation component 105 of FIG. 7 may use a power generation component, including photovoltaics 205 and a storage component 250 to provide additional power to power generation component 105 of FIG. 7 via a bus line. The charging component 110 may utilize the power on the bus line to charge the electric transport systems 135.

The power generation component may include photovoltaics 205, such as fuel cells or the like, to provide power. In some embodiments, the storage component 250 may provide power extracted from battery or gravity storage. The charging system 700 of FIG. 7 does not access the electric grid for charging.

Figure 8:
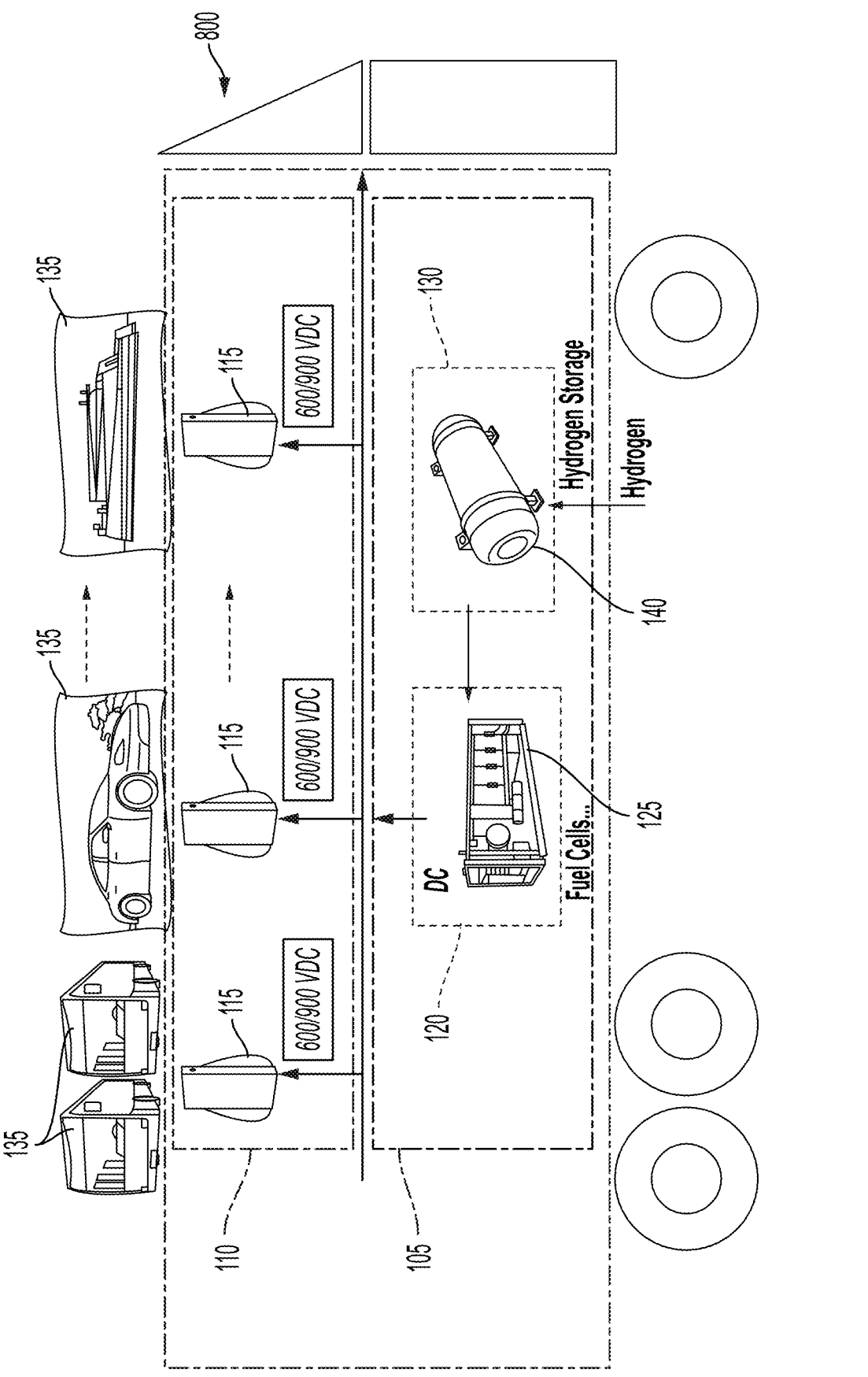
FIG. 8 is a schematic diagram of a vehicular mobile charging system for charging electric transport systems, in accordance with some embodiments.

FIG. 8 is a schematic diagram of a vehicular mobile charging system 800 for charging electric transport systems 135, in accordance with some embodiments. Note the vehicular mobile charging system 800 of FIG. 8 is similar to the vehicular mobile charging system 300 of FIG. 3. The difference between the vehicular mobile charging systems is the vehicular mobile charging system 800 of FIG. 8 may charge electric transport systems 135 including automobiles, electric floating systems, and electric vehicles, electric cars, electric buses, or the like. The vehicular charging system 800 of FIG. 8 does not access the electric grid for charging.

Figure 9:
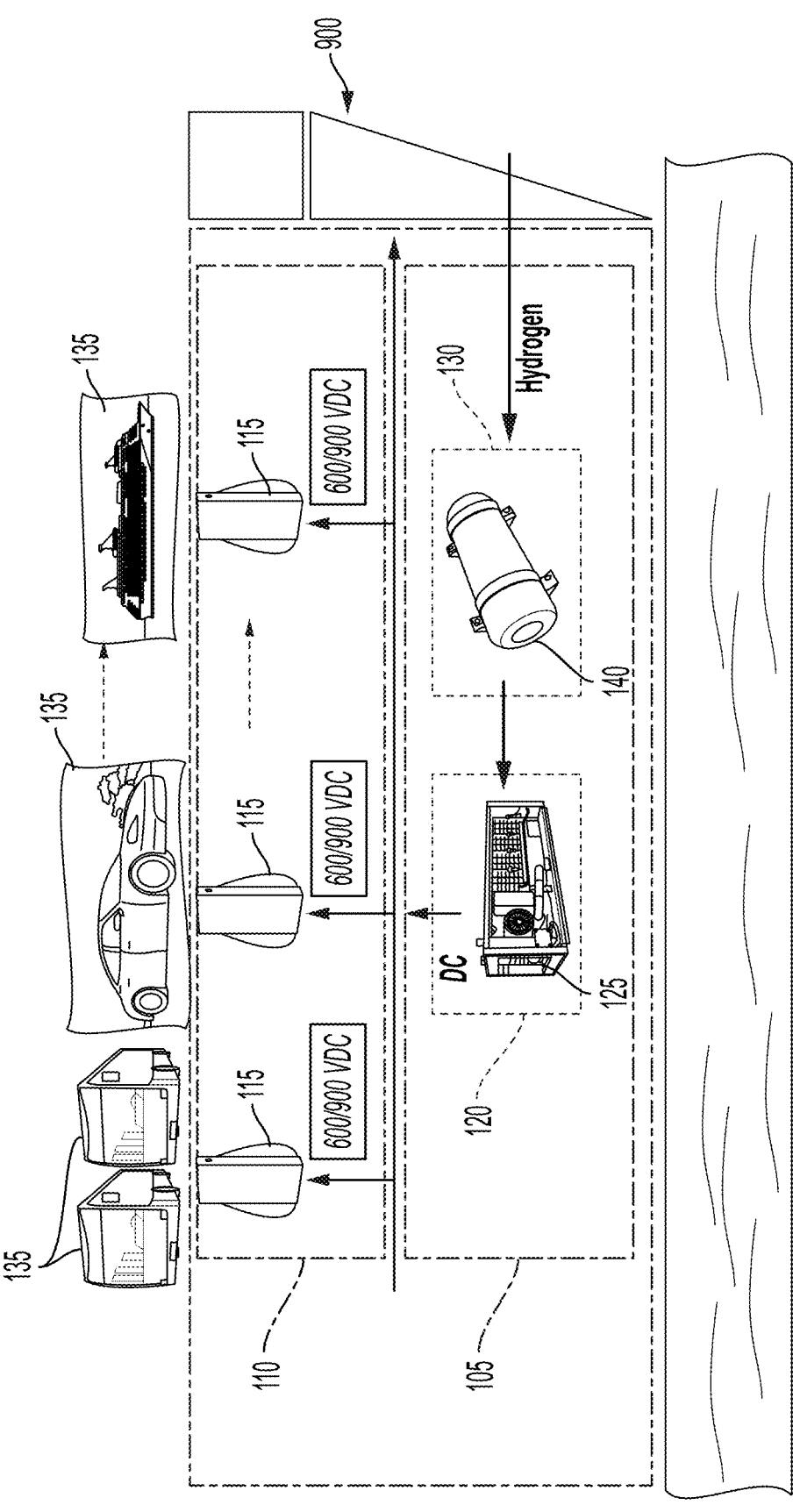
FIG. 9 is a schematic diagram of a floating mobile charging system for charging electric transport systems, in accordance with some embodiments.

FIG. 9 is a schematic diagram of a floating mobile charging system 900 for charging electric transport systems 135, in accordance with some embodiments. Note the floating mobile charging system 900 of FIG. 9 is similar to the floating mobile charging system 500 of FIG. 5. The difference between the floating mobile charging systems is the floating mobile charging system 900 of FIG. 9 may charge electric transport systems 135 including automobiles, electric floating systems, and electric vehicles, electric cars, electric buses, or the like. The floating mobile charging system 900 of FIG. 9 does not access the electric grid for charging.

Figure 10:
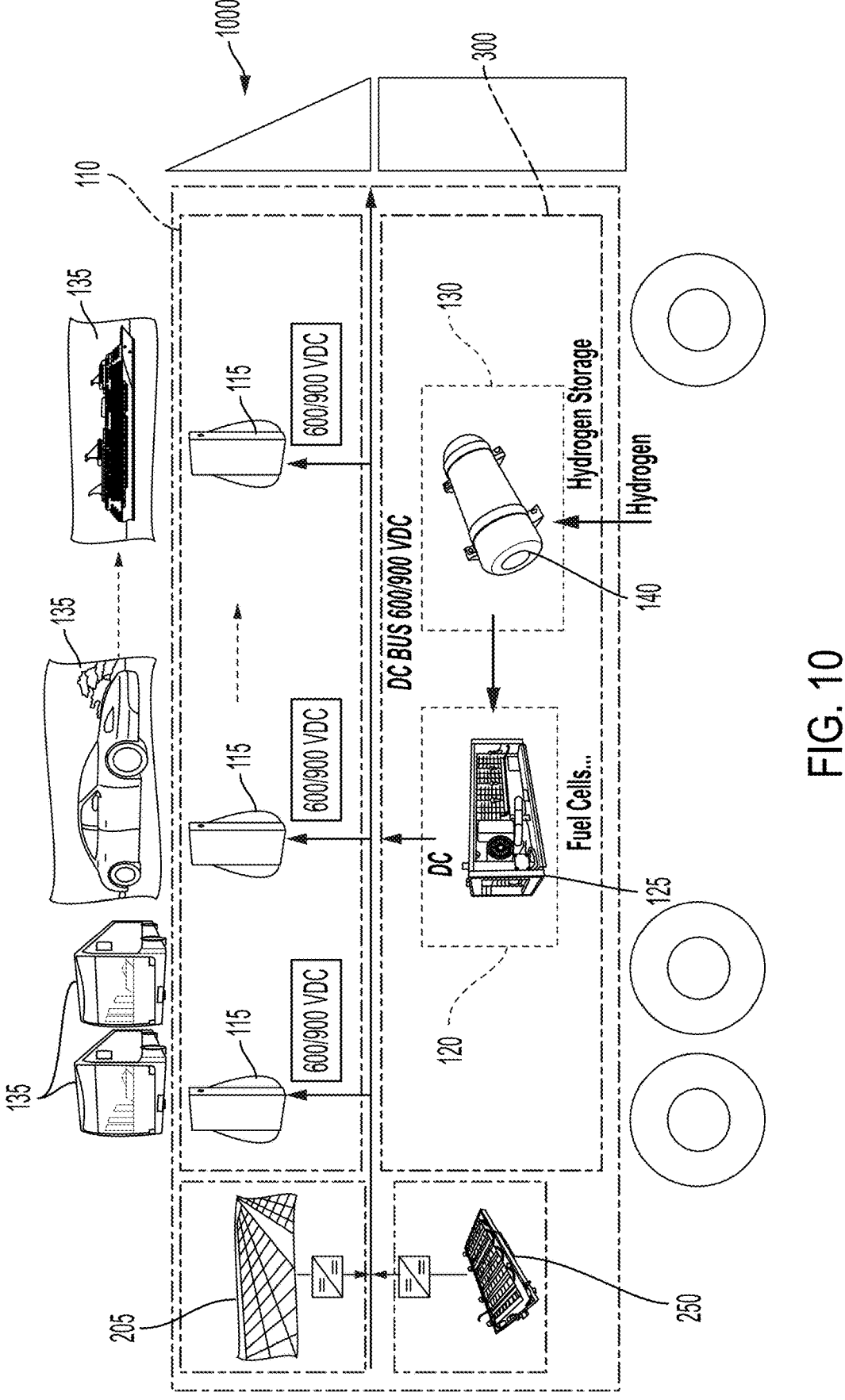
FIG. 10 is a schematic diagram of a vehicular mobile charging system for charging electric transport systems, in accordance with some embodiments.

FIG. 10 is a schematic diagram of a vehicular mobile charging system 1000 for charging electric transport systems 135, in accordance with some embodiments. The vehicular mobile charging system 1000 of FIG. 10 is similar to the vehicular mobile charging system 800 of FIG. 8. The differences between the vehicular mobile charging systems are the power generation component 105 of FIG. 10 may use a power generation component (e.g., photovoltaics 205) and a storage component 250 to provide additional power to power generation component 105 of FIG. 10 via a bus line. The charging component 110 may utilize the power on the bus line to charge the electric transport systems 135.

The power generation component may include photovoltaics 205, such as fuel cells or the like, to provide power. The storage component 250 may provide power extracted from the battery storage of the vehicular mobile charging system 1000, as similarly described in FIG. 4. The vehicular mobile charging system 1000 of FIG. 10 does not access the electric grid for charging.

Figure 11:
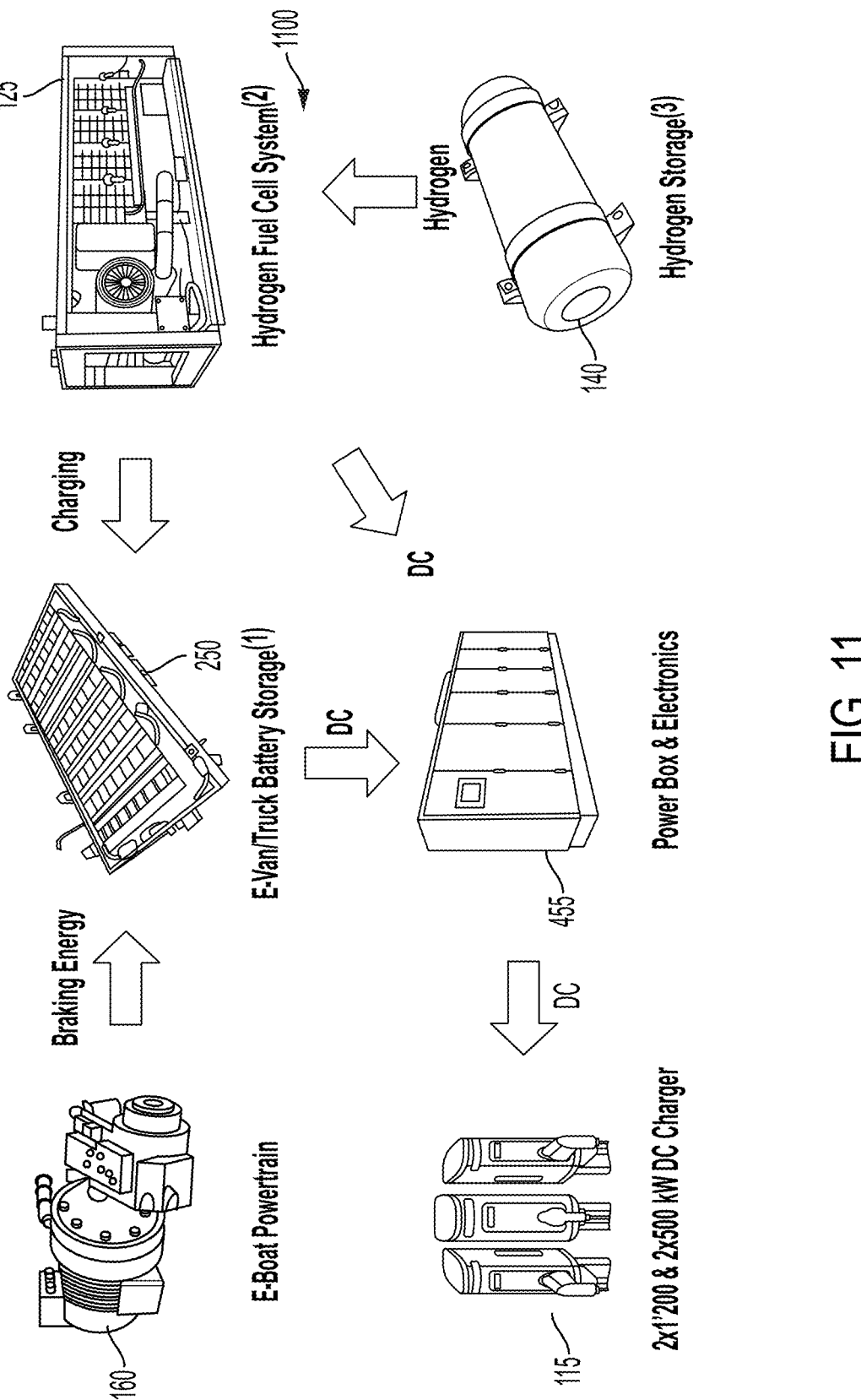
FIG. 11 is a schematic diagram of components in the floating mobile charging system of FIGS. 5 and 9 used for charging, in accordance with some embodiments.

FIG. 11 is a schematic diagram of components in the floating mobile charging system 500, 900 of FIGS. 5 and 9 used for charging electric transport systems 135, in accordance with some embodiments. The components for charging may include the powertrain system 1160 of the floating mobile charging system 1100, battery storage 250 of the floating mobile charging system 1100, a hydrogen fuel cell system 125, hydrogen storage tanks 140, a power box 455, and multiple chargers 115. In this case, the floating mobile charging system 1100 may be an electric floating transport system using battery storage 250 for power. With this arrangement, the fuel cell system 125 receives hydrogen fuel from the hydrogen storage tanks 140 to charge the battery storage 250 and provide power for charging purposes via the power box 455. Moreover, the floating mobile charging system 1100 may also use the powertrain system 1160 to charge the battery storage 250. The battery storage 250 provides excess power to the power box 455, and the power box 455 regulates the power received by both the battery storage 250 and fuel cell system 125 to the chargers 115 for charging electric transport systems 135. Note the components of FIG. 11 do not require accessing the electric grid for power.

Figure 12:
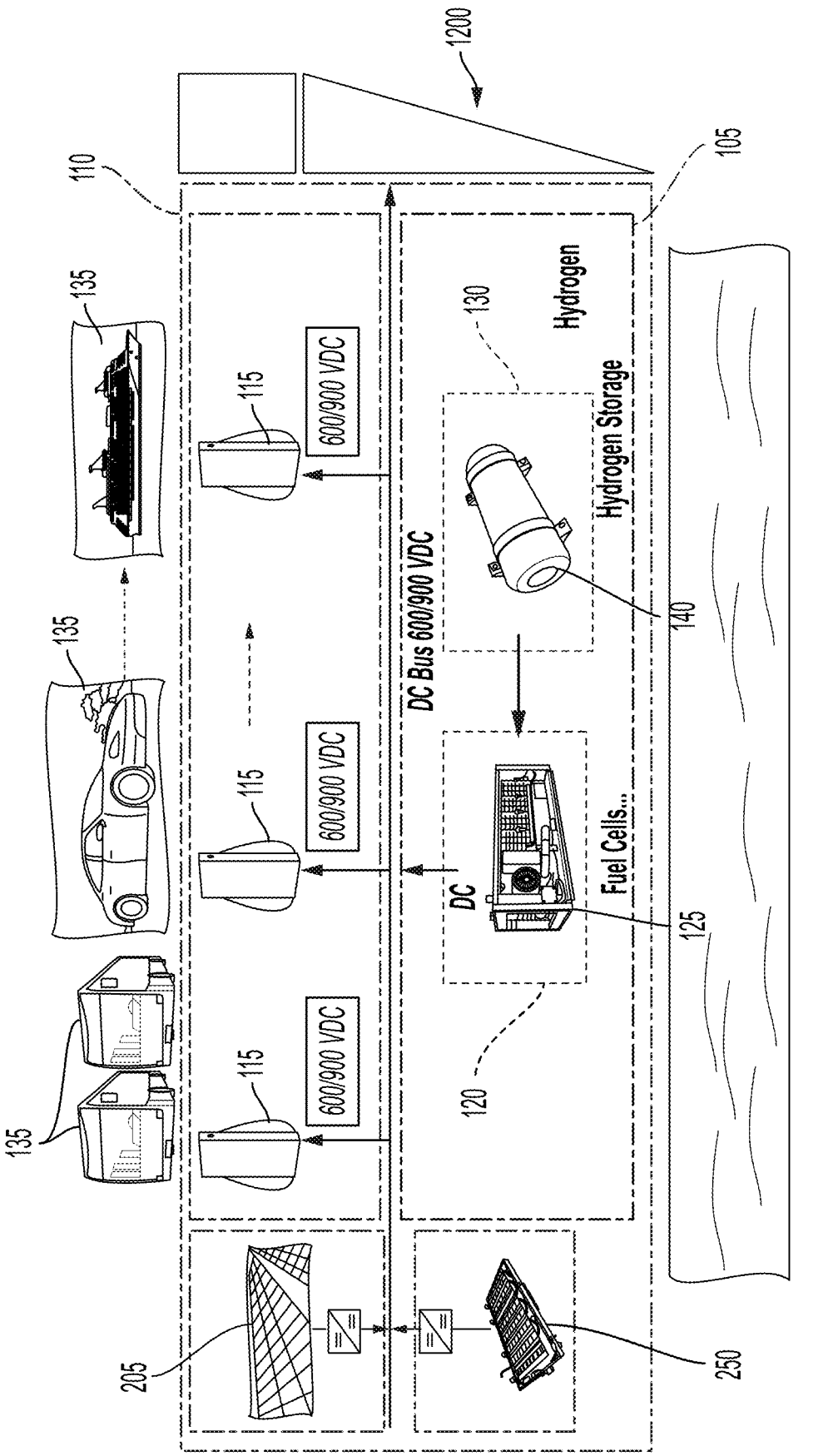
FIG. 12 is a schematic diagram of a floating mobile charging system for charging electric transport systems, in accordance with some embodiments.

FIG. 12 is a schematic diagram of a floating mobile charging system 1200 for charging electric transport systems 135, in accordance with some embodiments. The floating mobile charging system 1200 of FIG. 12 is similar to the floating mobile charging system 900 of FIG. 9. The difference between the floating mobile charging systems is the power generation component 105 of FIG. 12 may use a power generation component, which may include photovoltaics 205, and a storage component 250 to provide additional power to power generation component 105 of FIG. 12 via a bus line. The charging component 110 may utilize the power on the bus line to charge the electric transport systems 135.

The power generation component may include photovoltaics 205, such as fuel cells or the like, to provide power. The storage component 250 may provide power extracted from the battery storage of the floating mobile charging system 1200, as similarly described in FIG. 11. The floating mobile charging system 1200 of FIG. 12 does not access the electric grid for charging.

The disclosure describes various ways for charging electric transport systems 135, such as electric vehicles and/or electric floating transport systems. One advantage of using the charging systems described herein is they do not rely on the electric grid for power generation. This eliminates burdening the electric grid and provides a feasible way to increase the usage of electric transport systems 135. Moreover, the charging systems described herein do not rely on carbon-based fuel for power generation but hydrogen.

Accordingly, the charging systems described herein have zero air emissions because electricity is generated in an electrochemical process without combustion. In addition, the charging systems described herein deliver reliable high-quality and highly efficient DC power (up to 64%—therefore consuming less natural gas or biogas), and saves millions of liters of water. This is because it operates in water balance with no consumption or discharge of water in normal operations, thus operating quietly, and it has a small land footprint (<30-60 m2/MW).

Another advantage is the charging systems described herein may be modular (in the range of 0.5 MW up to 20 MW) systems designed to be installed at depots (for electric buses, trucks, vans), sea ports (for electric boats, cruisers), railway stations (for battery trains) and urban parking areas, or the like in order to charge vehicles with DC electricity as well supply heat and cold energy—with no transmission, distribution and conversion losses.

Reference in the specification to "one implementation" or "an implementation" means that a particular feature, structure, or characteristic described in connection with the implementation is included in at least one implementation of the disclosure. The appearances of the phrase "in one implementation," "in some implementations," "in one instance," "in some instances," "in one case," "in some cases," "in one embodiment," or "in some embodiments" in various places in the specification are not necessarily all referring to the same implementation or embodiment.

Finally, the above descriptions of the implementations of the present disclosure have been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Accordingly, the present disclosure is intended to be illustrative, but not limiting, of the scope of the present disclosure, which is set forth in the following claims.

What is claimed is:

1. A charging system comprising:
a fuel cell system for generating power for an electric transport system, the fuel cell system comprising: a plurality of hydrogen fuel cells for power generation, the plurality of hydrogen fuel cells forming at least one fuel cell stack assembly;
a fuel processing system connected to the at least one fuel cell stack assembly and configured to receive an input material comprising a natural gas and produce hydrogen fuel for the at least one fuel cell stack assembly of the fuel cell system;
a coolant flow line connected to the at least one fuel cell stack assembly and configured to circulate a coolant material to the at least one fuel cell stack assembly; and
a charging component comprising at least one charger comprising an electrical coupling configured to couple the fuel cell system to the electric transport system so that electrical power can be transferred from the fuel cell system to the electric transport system,
wherein the fuel cell system provides the electrical power to the electric transport system without requiring access to an electric grid,
wherein the charging system operates in a water balance with no consumption or discharge of water, and
wherein the charging system has a land footprint of less than 60 m2/MW.

2. The charging system according to claim 1,
wherein the at least one fuel cell stack assembly comprises from about 1 to about 50 hydrogen fuel cells.

3. The charging system according to claim 2,
wherein the charging system comprises from about 1 to about 10 fuel cell stack assemblies that each comprise from about 1 to about 50 hydrogen fuel cells.

4. The charging system according to claim 3,
wherein the fuel cell stack assemblies are each configured to provide an electrical power to the electric transport system ranging from about 30 kW to about 3,000 kW.

5. The charging system according to claim 3,
wherein the fuel cell stack assemblies are each configured to provide a voltage to the electric transport system ranging from about 30 volts as direct current to about 3,000 volts as direct current.

6. The charging system according to claim 1,
further comprising at least one storage tank for storing hydrogen as fuel for the plurality of hydrogen fuel cells.

7. The charging system according to claim 6, wherein the hydrogen is produced from at least one of a natural gas processing plant and a water electrolysis plant.

8. The charging system according to claim 1, further comprising:
photovoltaics configured to convert light into electricity; and
DC batteries connected to the photovoltaics through an electrical connector configured to transport the electricity produced by the photovoltaics to the DC batteries for storage,
wherein the DC batteries are connected to the electric transport system through another electrical connector configured to provide the electrical power to the electric transport system.

9. The charging system according to claim 1,
wherein the charging system comprises an even number of fuel cell stack assemblies arranged in pairs and in a parallel configuration, each fuel cell stack comprising from 1 to about 50 hydrogen fuel cells, and
wherein each pair of fuel cell stacks provides about 600 volts as direct current to the electric transport system.

10. The charging system according to claim 1, wherein the electric transport system comprises at least one of an automobile and a watercraft.

11. A vehicular charging system comprising:
a fuel cell system for generating power for an electric transport system, the fuel cell system comprising: a plurality of hydrogen fuel cells for power generation, the plurality of hydrogen fuel cells forming at least one fuel cell stack assembly;
a fuel processing system connected to the at least one fuel cell stack assembly and configured to receive an input material comprising a natural gas and produce hydrogen fuel for the at least one fuel cell stack assembly of the fuel cell system;
a coolant flow line connected to the at least one fuel cell stack assembly and configured to circulate a coolant material to the at least one fuel cell stack assembly; and
a charging component comprising at least one charger comprising an electrical coupling configured to couple the fuel cell system to the electric transport system so that electrical power can be transferred from the fuel cell system to the electric transport system,
wherein the fuel cell system provides the electrical power to the electric transport system without requiring access to an electric grid,
wherein the charging system operates in water balance with no consumption or discharge of water, and
wherein the charging system has a small land footprint of less than 60 m2/MW; and
a container configured to house each of the fuel cell system and the charger, wherein the container is mobile.

12. The vehicular charging system according to claim 11, wherein the container is an automobile comprising an engine, a plurality of wheels, and a drive system, the automobile configured to transport the vehicular charging system from one position to another on land.

13. The vehicular charging system according to claim 11, wherein the container is a watercraft comprising a hull and a propulsion system, the watercraft configured to transport the vehicular charging system from one position to another on water.

14. The vehicular charging system according to claim 11, wherein the electric transport system comprises at least one of an automobile and a watercraft.

15. The vehicular charging system according to claim 11, wherein the at least one fuel cell stack assembly comprises from about 1 to about 50 hydrogen fuel cells.

16. The vehicular charging system according to claim 15, wherein the vehicular charging system comprises from about 1 to about 10 fuel cell stack assemblies that each comprise from about 1 to about 50 hydrogen fuel cells.

17. The vehicular charging system according to claim 16, wherein at least one of:

the fuel cell stack assemblies are each configured to provide an electrical power to the electric transport system ranging from about 30 kW to about 3,000 kW, and the fuel cell stack assemblies are configured to provide a voltage to the electric transport system ranging from about 30 volts as direct current to about 3,000 volts as direct current.

18. The vehicular charging system according to claim 11, further comprising at least one storage tank for storing hydrogen as fuel for the plurality of hydrogen fuel cells.

19. The vehicular charging system according to claim 11, further comprising:

photovoltaics configured to convert light into electricity; and

DC batteries connected to the photovoltaics through an electrical connector configured to transport the electricity produced by the photovoltaics to the DC batteries for storage, wherein the DC batteries are connected to the electric transport system through another electrical connector configured to provide the electrical power to the electric transport system.

20. The vehicular charging system according to claim 11, wherein the vehicular charging system comprises an even number of fuel cell stack assemblies arranged in pairs and in a parallel configuration, each fuel cell stack assembly comprising from 1 to about 50 hydrogen fuel cells, and wherein each pair of fuel cell stack assemblies stacks provides about 600 volts as direct current to the electric transport system.

* * * * *